Aug. 25, 1959  F. E. FINLAYSON  2,901,584
THERMOSTATICALLY CONTROLLED FLATIRON
Filed Oct. 27, 1954

Inventor:
Frank E. Finlayson,
by *His Attorney.*

United States Patent Office 2,901,584
Patented Aug. 25, 1959

2,901,584

THERMOSTATICALLY CONTROLLED FLATIRON

Frank E. Finlayson, Ontario, Calif., assignor to General Electric Company, a corporation of New York Application October 27, 1954, Serial No. 464,960

9 Claims. (Cl. 219—25)

My invention relates to electric flatirons and more particularly to such flatirons including a thermostatic mechanism for controlling the temperature thereof.

Since different materials require different temperatures for optimum ironing thereof, electric flatirons are conventionally provided with adjustable thermostatically controlled mechanisms for maintaining the temperature of the iron at any desired temperature over a substantial range. Usually the thermostatic mechanism is mounted in the body of the iron between the cover or shell and the soleplate. It is customary to provide a control knob for varying the temperature to secure the desired setting and, for convenience, this knob is sometimes located on or in the region of the handle. This, of course, necessitates a connection between the control knob and the thermostatic mechanism and may involve difficulties and complexities in the assembling of the iron and the proper connecting of the parts of the control mechanism. By my invention the control knob and its associated elements and all parts of the thermostatic switch mechanism are mounted on the handle structure, only the temperature-responsive element itself being assembled within the body of the iron in contact with the soleplate for indicating the temperature of the soleplate. Substantially all parts of the mechanism may thereby be included on the handle as a subassembly and, after assembly of the handle on the iron, the mechanism may be appropriately related to the temperature-responsive element by a simple calibrating operation.

It is an object of my invention to provide an improved thermostatically controlled electric flatiron which is simple in construction, employs a minimum of parts, and is easy to assemble.

It is another object of my invention to provide an improved thermostatically controlled electric flatiron in which substantially all the control mechanism may be mounted on the handle as a subassembly and the handle conveniently assembled to the body of the iron.

Further objects and advantages of my invention will become apparent as the following description proceeds and the features of novelty which characterize my invention will be pointed out with particularity in the claims annexed to and forming part of this specification.

In carrying out the objects of my invention in one form thereof, a thermostatically controlled switch mechanism is mounted on the underside of a handle which is composed of electrically insulating material. A control knob is conveniently disposed for adjusting the temperature setting of the control mechanism and this knob is connected to a control rod which is conveniently assembled on the handle structure. A temperature-responsive element is mounted directly to the soleplate for responding to the temperature thereof and is arranged to actuate the switch contacts of the thermostatic switch mechanism. A conveniently accessible calibrating screw is provided for adjusting the relationship of the temperature-responsive element and the switch after the assembly of the iron has been completed.

For a better understanding of my invention reference may be made to the accompanying drawing in which Fig. 1 is an elevation view, partly in section, of an electric flatiron incorporating an embodiment of my invention.

Figure 1:
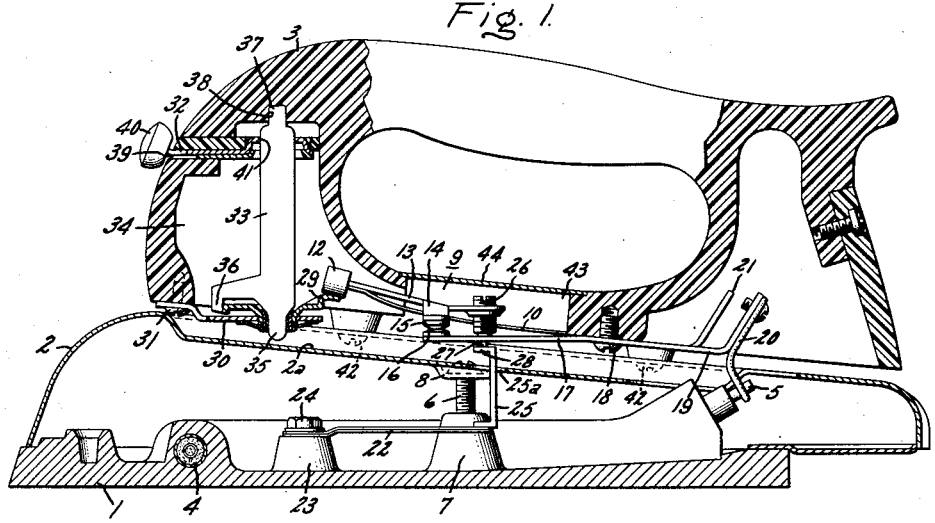

The iron illustrated in the drawing includes a soleplate 1, a cover or shell 2 and a handle 3. Heat is supplied to the soleplate by a heating element 4, preferably of the sheathed type, embedded in the soleplate 1. Conventionally the heating element 4 is generally U-shaped and includes two terminals at the rear end, one of which is shown at 5.

In the form of invention illustrated the cover 2 is secured to the soleplate 1 by two screws 6. Each of these screws 6 is received within a corresponding threaded boss 7 which is formed integral with and extends upwardly from the soleplate 1. Depressions 8 are formed in the cover 2 for receiving the heads of the screws 6.

In order to control the temperature of the iron so as to maintain it within any desired range, a thermostatic switch mechanism, indicated generally at 9, is employed. This mechanism includes a flexible leaf spring 10. The leaf spring 10 is supported by a screw 11 threadedly received in a recess in the underside of the insulating handle 3 toward the rear thereof. The leaf spring 10 extends forwardly from its mounting point. To the extremity of the free end of the leaf spring there is secured an insulator 12, and an arm 13 which extends rearwardly in generally parallel relationship to the leaf spring 10. The leaf spring 10 and the arm 13 may be secured to each other at the forward ends thereof or they may be formed integrally from a single strip folded back upon itself. Preferably these two elements have a press fit in a recess in the insulator 12. Preferably also the leaf spring 10 and the arm 13 are formed of separate strips since it is somewhat desirable to have a greater rigidity to the arm 13 than to the long, flexible and resilient leaf spring 10.

The arm 13 is formed to include a laterally extending tongue 14 which has a movable contact 15 mounted on the end thereof. A fixed contact 16 is provided for cooperating with the movable contact 15 to control the making and breaking of the circuit to the heating element 4. The contact 16 is mounted on the end of a relatively rigid contact arm 17 which is supported by a screw 18 from the underside of the rearward portion of the insulating handle 3. As in the case of the screw 11, the screw 18 is threadedly received in a threaded recess in the iron handle. The top of the cover 2 is formed to provide a depressed portion 2a. This provides a convenient space between the cover and the handle to receive the switch mechanism 9.

Since it does not form part of my invention, the details of the iron cord and its connection to the iron have not been shown. It will be apparent from the illustration, however, that the fixed contact arm 17 includes a rearward extension 19 which is connected by a strap 20 to one of the terminals 5 at one end of the U-shaped heating element 4. Similarly the leaf spring 10 includes a rearward extension 21. One end of the electric supply cord is then connected to the other terminal 5 of the heating element 4, and the other end is connected to the extension 21 so that power is supplied to the heating element 4 through the thermostatic switch mechanism 9.

In order to control the actuation of the movable switch contact 15 for opening and closing the thermostatic switch mechanism 9, a temperature-responsive element 22 is provided. In the form illustrated the element 22 is a bimetallic strip which is mounted in intimate heat exchange relationship with the soleplate 1. Specifically to accomplish this heat exchange and to insure direct response to the temperature of the soleplate, one end of the bimetal is mounted in direct contact with a boss 23 formed integral with the soleplate by means of a screw 24 received in a threaded recess in the boss 23. An actuating arm or member 25 is connected to the free end of the bimetal 22 and extends upwardly therefrom through an opening 25a in the cover 2 so as to effect actuation of the arm 13 and the movable contact 15. Connection between the member 25 and the arm 13 is provided through the medium of a calibrating screw 26. The calibrating screw is threadedly received in an opening in the rear end of the arm 13 and includes a projection or tip 27 of electrically insulating material which is engaged by a flange 28 on the upper end of the member 25. It can be readily seen that upward movement of the member 25 by the bimetal 22 lifts the rear end of the arm 13 and ultimately effects separation of the contacts 15, 16 to interrupt this circuit to the heating element 4.

In order to adjust the temperature setting of the thermostatic mechanism, a cam 29 is provided for engagement with the insulator 12. The cam 29 is received within an opening in a supporting bracket 30. The bracket 30 is also mounted on the underside of the handle 3 by means of a screw 31 which is threadedly received in a recess in the handle at the forward portion thereof. In order to provide for adjusting the position of the cam 29, a control lever 32 and a control member 33 are provided. The control member 33 is received in a vertical position within a passage 34 provided in the hollow front supporting portion of the handle 3. The member 33 is in the form of a flat elongated element whose lower end 35 is received within an opening 35a in the central portion of a cam 29. The lower end of the member 33 also includes a leg 36 which engages a notch in the periphery of the cam 29 for effecting rotation of the cam as the member 33 is rotated. The upper end 37, which is preferably shaped to provide a circular cross section, is received within a circular recess 38 in the handle 3 at the upper end of the passage 34. The member 33 is thus mounted for rotational movement about a vertical axis by the cooperation between the upper end 37 and the recess 38 and between the lower end 35 and its corresponding opening 35a. The member is supported by the bracket 30 which also supports the cam 29.

The control lever 32 extends through a transverse passage 39 at the forward portion of the iron and has mounted on its outer end a knob 40 for convenience in actuation of the control lever. The rear end of the control lever 32 is provided with an elongated slot at 41 in which the member 33 is received. Thus, because of the cooperation of the elongated slot 41 and the member 33, the member 33 is rotated about its vertical axis as the knob 40 and the control lever 32 are moved in a horizontal plane. The rotation of the member 33 is transmitted to the cam 29, because of the cooperation of the leg 36 and the notch in the cam 29, to adjust the position of the cam. The cam is shaped as illustrated to provide a surface of varying height so that as the cam is rotated, the height of the insulator 12 is also varied. The insulator 12 is kept continuously in contact with the upper surface of the cam 29 because of the resilience of the leaf spring 10.

When it is desired to adjust the temperature setting of the flatiron, the control knob 40 is moved to rotate the cam 29. Thus, as the cam 29 is rotated from the position shown in Fig. 1 to a position in which a lower portion of the cam surface is in engagement with the insulator 12, the insulator 12 moves to a lower position carrying with it the movable contact 15 on the arm 13. The bimetal 22 is arranged so that its free or right end flexes upwardly as the temperature of the soleplate rises. Accordingly, when the cam position is adjusted to lower the position of the contact 15 and the arm 13, upward movement of the bimetal and the member 25 upon heating of the flatiron causes a separation of the contacts 15 at a lower temperature than in the previous setting of the cam.

It can be seen that substantially the entire thermostatic control mechanism is mounted on the handle 3 of the iron. The parts are easily assembled and mounted on the handle by means of the screws 11, 18 and 31, as described above. Thus, the handle and the switch mechanism for the flatiron may conveniently be completed as a subassembly for later mounting on the body of the iron composed of the soleplate 1 and the cover or shell 2. Moreover, the handle, being comprised of electrical insulating material, acts as an insulating support or frame for the parts of the switch mechanism. In assembling the iron, the subassembly, including the handle and the associated switch mechanism, is first mounted on the cover or shell 2 by means of a plurality of screws 42 which are received in threaded recesses in the underside of the handle 3. The assembly including the handle and its associated mechanism and the cover 2 are then assembled to the soleplate by means of the screws 6. In order to provide accessibility to the screws 6 for this final assembly, the handle is formed to provide a recess 43 in the central lower portion thereof. The recess 43 is covered after the iron has been completely assembled by a metal saddle plate 44 which may be snapped into place in a conventional manner.

It will be apparent that there may be some variation in the relationship of the various parts in the assembled structure as a result of variations in the manufacturing operations. In order to provide for accurate setting of the temperature of the iron despite such variations, the calibrating screw 26 is employed. As previously described, the calibrating screw 26 engages the upper end of the bracket 25 which in turn is secured to the free end of the bimetal 22. After assembly of the iron has been completed the calibrating screw is located in line with the aforementioned recess 43 and is therefore readily accessible for adjustment so that the temperatures maintained by the mechanism agree with the temperatures indicated on the dial associated with the control knob 40. After the iron has been properly calibrated by adjusting the screw 26, the saddle plate 44 is assembled to complete the iron.

Figure 2:
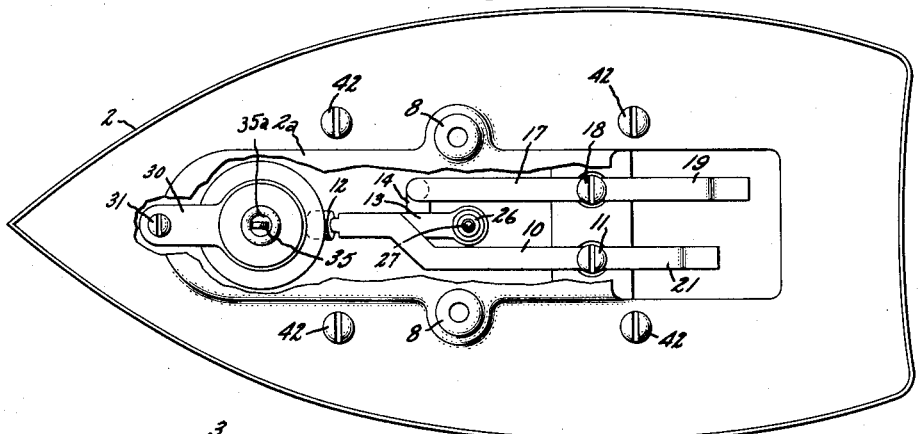
Fig. 2 is a bottom plan view of the iron of Fig. 1 with the soleplate removed.
Figure 3:
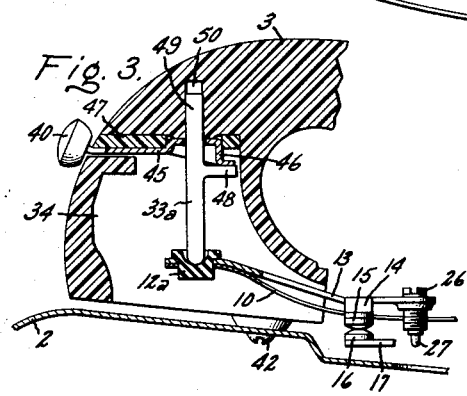
Fig. 3 is an elevation view, partly in section, showing a modified form of my invention.

A modified form of my invention is shown in Fig. 3. The same numerals have been applied to the same parts in Figs. 1 and 2 and in Fig. 3. The modified structure includes a cover 2 and a handle 3, the cover being secured to the handle by screws 42, as in the form previously described. Also as in the form previously described, the handle includes a hollow forward portion 34 for receiving elements of the thermostat adjusting mechanism.

In the form shown in Fig. 3 the leaf spring 10 has mounted on the end thereof an insulator 12a, corresponding in general function to insulator 12 in the form previously described. The insulator 12a is biased upwardly into engagement with an elongated control bar 33a by means of the leaf spring 10.

In order to effect a vertical movement of the elongated member 33a in this form of my invention so as to adjust the temperature setting of the thermostat, a combined cam and cam-actuating member 45 is provided at the upper end of the hollow portion 34 of the handle. The member 45 extends forwardly through a slot in the forward portion of the handle. A control knob 40 is mounted on the outer end so as to be available for easy finger manipulation by the user at the forward end of the iron. The cam portion 46 of this combined member extends upwardly into and is received in a recess in a dial plate 47. The lower surface of the cam is arranged to engage an ear 48 extending laterally from the elongated member 33a. In order to prevent rotation of the elongated member 33a and to assist in supporting this member during vertical movement thereof, the upper end 49 is formed of rectangular cross section and is slidably received within a recess 50 of corresponding cross section in the handle at the upper end of the hollow portion 34.

In order to adjust the temperature setting of the iron the combined cam and cam-actuating member 45 is rotated in a horizontal plane. As this member is rotated, engagement of the cam portion 46 with the ear 48 effects vertical movement of the elongated member 33a and corresponding adjustment of the temperature setting of the thermostat in the same general manner as described in detail in connection with the form illustrated in Figs. 1 and 2.

While I have shown and described specific embodiments of my invention, I do not desire my invention to be limited to the particular constructions shown and described and I intend, by the appended claims, to cover all modifications within the spirit and scope of my invention.

What I claim as new and desire to secure by Letters Patent of the United States is:

1. An electric flatiron comprising a soleplate, a cover, a handle composed of electrically-insulating material, a leaf spring having one end mounted directly on the underside of said handle, an insulator mounted on the free end of said leaf spring, an arm carried by said leaf spring, a movable contact carried by said arm, a fixed contact mounted directly on said handle and adapted to be engaged by said movable contact, said leaf spring and said fixed contact being electrically isolated by the insulating material of said handle, an adjusting means engaging said insulator for varying the temperature setting of the flatiron, and a temperature-responsive element mounted on said soleplate and engaging said arm to effect movement of said movable contact into and out of engagement with said fixed contact.

2. An electric flatiron comprising a soleplate, a cover, a handle composed of electrically-insulating material, a leaf spring having one end mounted directly on the underside of said handle, an insulator mounted on the free end of said leaf spring, a movable contact carried by said leaf spring, a fixed contact mounted directly on the underside of said handle and adapted to be engaged by said movable contact, said leaf spring and said fixed contact being electrically isolated by the insulating material of said handle, a temperature-responsive element mounted on said soleplate for effecting movement of said movable contact into and out of engagement with said fixed contact, a cam for engaging said insulator to vary the temperature setting of the flatiron, and a bracket mounted on the underside of said handle for supporting said cam.

3. An electric flatiron comprising a soleplate, a cover, a handle composed of electrical insulating material, a leaf spring having one end mounted directly to the underside of said handle, said leaf spring extending forwardly to the forward portion of said iron, a movable contact carried by said leaf spring, a fixed contact mounted directly to the underside of said handle and adapted to be engaged by said movable contact, said handle thereby providing the frame for said leaf spring and said contacts and the means for insulating said contacts, a temperature responsive element mounted on said soleplate for effecting movement of said movable contact into and out of engagement with said fixed contact, a cam for engaging said leaf spring to vary the temperature setting of the flatiron, said handle including a hollow front supporting portion, an elongated member vertically positioned in said hollow portion for actuating said cam, a bracket mounted on the underside of said handle at the forward portion of said hollow portion and extending rearwardly beneath said hollow portion for supporting said cam and the lower end of said elongated member, said handle further including a recess at the front end of said hollow portion, and the upper end of said elongated member being rotatably received in said recess.

4. An electric flatiron comprising a soleplate, a cover, a handle composed of electrically insulating material, said handle including a hollow supporting portion, a resilient member having one end mounted directly on the underside of said handle, an insulator mounted on the free end of said resilient member, an arm carried by said resilient member, a movable contact carried by said arm, a fixed contact mounted directly on said handle and adapted to be engaged by said movable contact, said resilient member and said fixed contact being electrically isolated by the insulating material of said handle, a combined cam and cam actuating member mounted in the upper end of the hollow supporting portion of said handle, motion transmission means extending from said cam to said insulator for varying the temperature setting of the flatiron, and a temperature-responsive element mounted on said soleplate and engaging said arm to effect movement of said movable contact into and out of engagement with said fixed contact.

5. The combination of claim 4 wherein said insulator is formed with an upwardly facing depression and said motion transmission means is in the form of an elongated member supported in said depression.

6. The combination of claim 4 wherein said motion transmission means is in the form of an elongated member slidably and non-rotatably mounted in said handle in position for cooperation with said cam.

7. The combination of claim 4 wherein a transverse slot is provided at the upper portion of said handle communicating with the upper end of said hollow portion at the forward end of the iron, and said combined cam and cam-actuating member extends through said transverse slot for finger manipulation at the exterior of the forward portion of the iron.

8. An electric flatiron comprising a soleplate, a cover, a handle composed of electrical insulating material and including a hollow supporting portion, a switch mechanism including a fixed contact and a movable switch arm having a contact mounted thereon, said fixed contact and said movable switch arm being directly mounted in spaced relationship to the underside of said handle, said handle thereby providing an electrically isolated switch frame, said cover having a depressed portion on the top thereof providing a space between said handle and cover to receive said switch mechanism, means securing said cover to said handle, a temperature-responsive element mounted on said soleplate, means transmitting motion from said temperature-responsive element through said cover to said arm to effect movement of said movable contact into and out of engagement with said fixed contact, a manually adjustable cam in the hollow supporting portion of said handle, motion transmission means between said cam and said movable switch arm thereby to manually select the iron operating temperature, and means securing said cover to said soleplate.

9. An electric flatiron comprising a soleplate, a cover, a handle composed of electrical insulating material, a switch mechanism including a fixed contact and a movable switch arm having a contact mounted thereon, said fixed contact and said movable switch arm being directly mounted in spaced relationship to the underside of said handle, said handle thereby providing an electrically isolated switch frame, said cover having a depressed portion on the top thereof providing a space between said handle and cover to receive said switch mechanism, means securing said cover to said handle, a temperature responsive element mounted on said soleplate, means transmitting motion from said temperature responsive element through said cover to said arm to effect movement of said movable contact into and out of engagement with said fixed contact, and means securing said cover to said soleplate.

(References on following page)

References Cited in the file of this patent

UNITED STATES PATENTS

| | | |
|---|---|---|
| 2,244,915 | Marvin | June 10, 1941 |
| 2,288,517 | Dubilier | June 20, 1942 |
| 2,496,746 | Opperman | Feb. 7, 1950 |
| 2,569,259 | Purpura | Sept. 25, 1951 |
| 2,593,812 | Turner | Apr. 22, 1952 |
| 2,681,521 | Finlayson et al. | June 22, 1954 |
| 2,716,173 | Russell | Aug. 23, 1955 |

FOREIGN PATENTS

| | | |
|---|---|---|
| 295,636 | Switzerland | Mar. 16, 1954 |
| 430,797 | Italy | Feb. 20, 1948 |
| 622,681 | Great Britain | May 5, 1949 |